United States Patent [19]
Duck et al.

[11] Patent Number: 5,790,314
[45] Date of Patent: Aug. 4, 1998

[54] GRIN LENSED OPTICAL DEVICE

[75] Inventors: Gary S. Duck, Nepean; Yihao Cheng, Kanata, both of Canada

[73] Assignee: JDS Fitel Inc., Nepean, Canada

[21] Appl. No.: 791,325

[22] Filed: Jan. 31, 1997

[51] Int. Cl.[6] ............................... G02B 3/00; G02B 6/32
[52] U.S. Cl. ........................... 359/654; 359/652; 385/33
[58] Field of Search ................................. 359/652, 653, 359/654; 385/33

[56] References Cited

U.S. PATENT DOCUMENTS

| | | | |
|---|---|---|---|
| 4,504,950 | 3/1985 | AuYeung | 359/654 |
| 5,539,577 | 7/1996 | Si et al. | 385/33 |
| 5,612,824 | 3/1997 | Si et al. | 359/652 |

*Primary Examiner*—Scott J. Sugarman
*Attorney, Agent, or Firm*—Neil Teitelbaum & Associates

[57] ABSTRACT

An optical device is disclosed wherein a first GRIN lens and a second GRIN lens having their optical axes offset. The first GRIN lens has one or more input ports at an input end. The second GRIN lens is disposed to receive light from the first GRIN lens. A reflecting surface is coated onto a second end face of the second GRIN lens or alternatively is disposed adjacent to the second end face and positioned to reflect an input beam of light launched into the input end face of the first GRIN lens. The reflective surface is at a location where light incident upon it to be returned to the first GRIN lens is collimated. By placing a filter and third GRIN lens between the first and second lenses double filtering may be achieved at the pass band or pass wavelength of the filter. Furthermore, the more simple arrangement including only first and second lenses provides a means of directing light into and out of the device at different angles or directions with respect to the optical axis of the first lens.

19 Claims, 5 Drawing Sheets

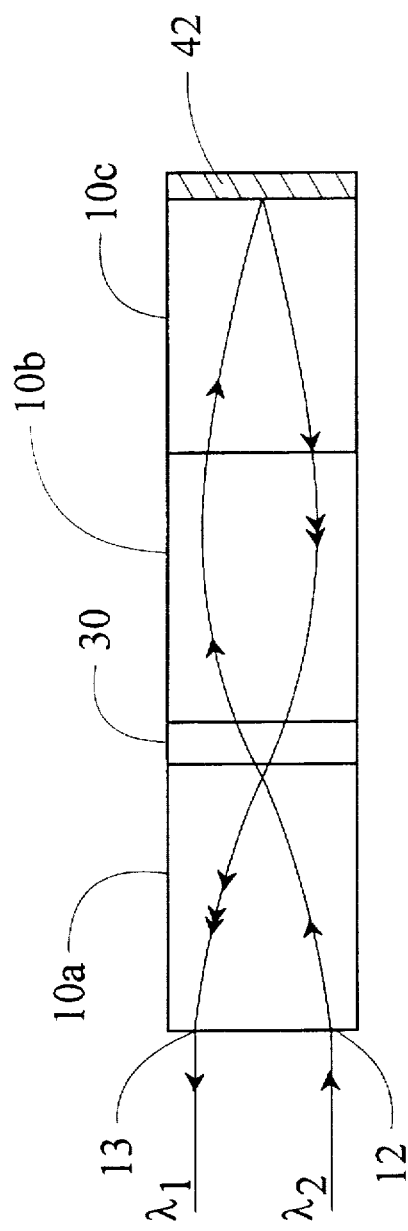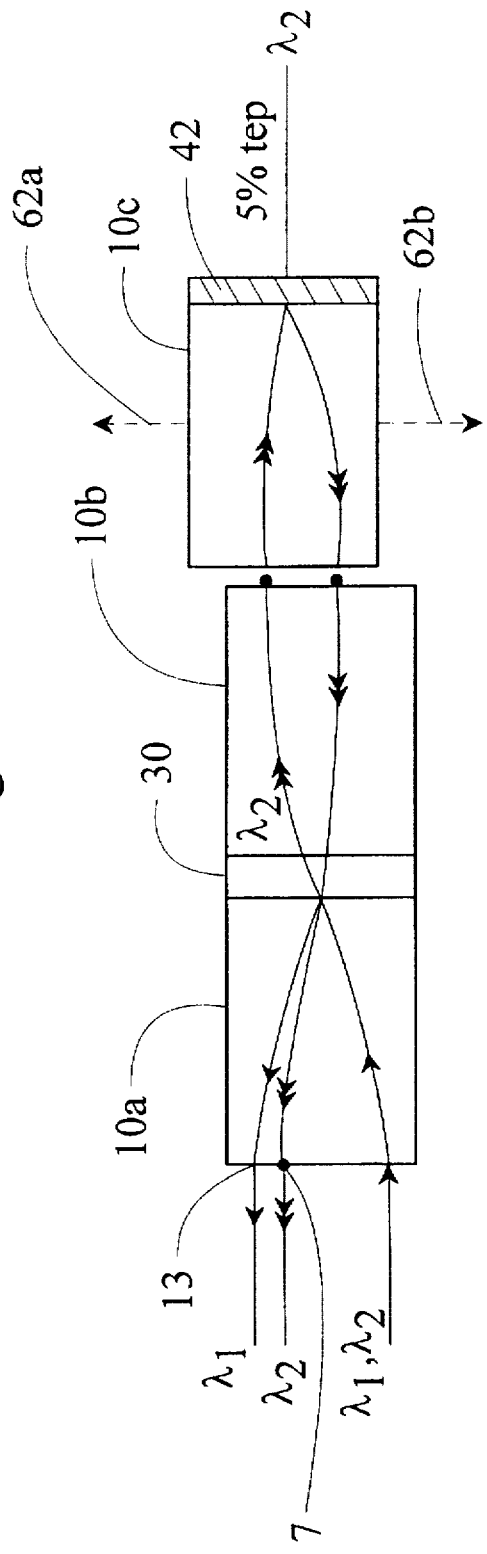

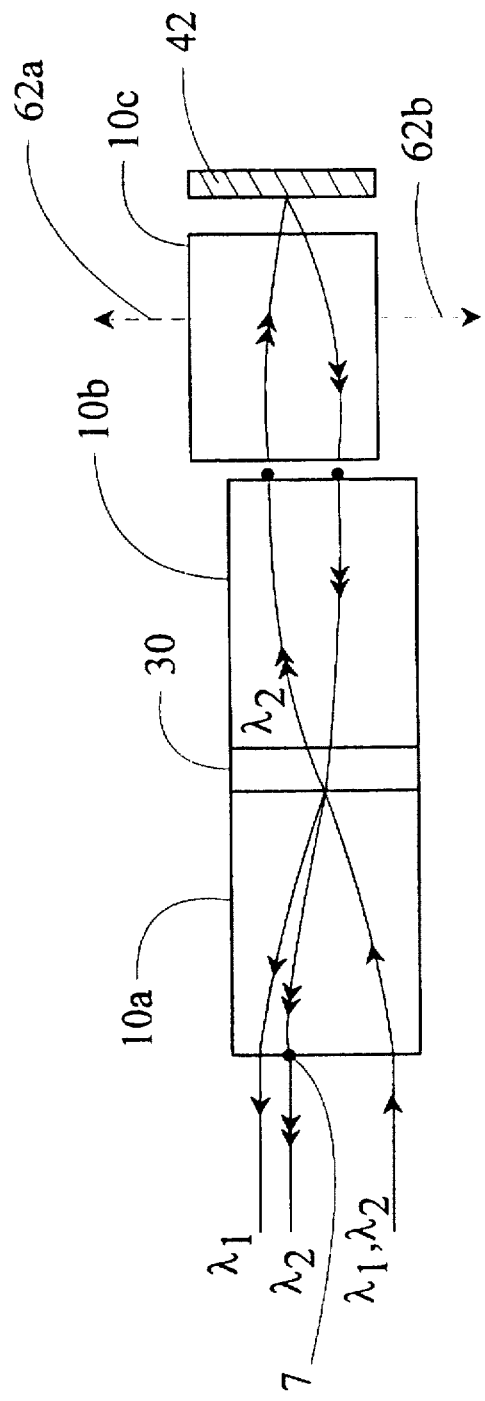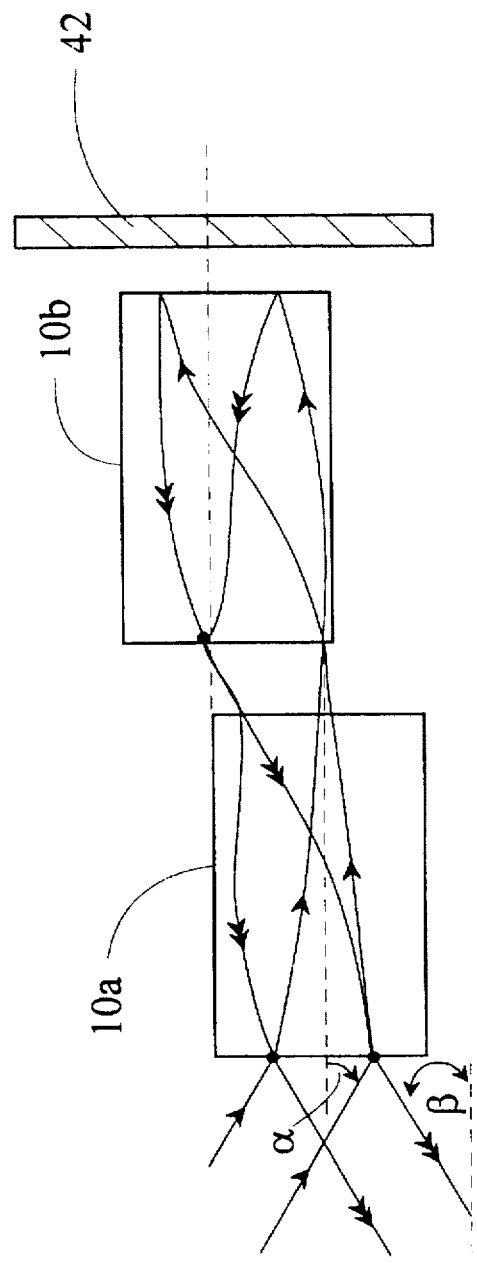

GRIN LENSED OPTICAL DEVICE

FIELD OF THE INVENTION

This invention relates generally to the coupling of light through graded index lenses and more particularly in one embodiment to a device that provides multi-pass filtering through a same filter element.

BACKGROUND OF THE INVENTION

One of the more common constructions of optical wavelength division multiplexed (WDM) filters is a WDM filter element typically comprising a multi-layered thin film structure deposited on a transparent substrate, between two, quarter-pitch graded index (GRIN) lenses. In some instances the thin film coating is applied to one of the end faces of the lens. Lenses of this type are produced under the trade name "SELFOC"; the mark is registered in Japan and owned by the Nippon Sheet and Glass Co. Ltd. The optical axis of a GRIN lens is the axis of symmetry of the refractive index of the lens. Furthermore, the optical axis of a rod-like GRIN lens is along the central longitudinal axis of the rod lens.

At a location along the lens, in this instance the end face, indicated as 0.25 pitch, the input beam becomes collimated. This phenomenon is further demonstrated in FIG. 1, where, two matched quarter pitch GRIN lenses are disposed in a back to back relationship. Each GRIN lens is provided with a port which is a point or region along an endface of the lens for receiving or transmitting a beam of light.

Although these WDM filters perform their intended function, filters having a sharper, steeper more square response are at times required. This desired response can be achieved by passing a beam through multiple, similar, cascaded filters; or alternatively, and less preferred, by sandwiching two WDM filter elements together. The latter solution is however difficult to manufacture and tends not to be a reliable design.

It is therefore an object of this invention, to provide a method and device which passes at least a wavelength of light through a filter more than one time.

It is a further object of the invention to provide a novel, compact, optical device that via reflection passes input light through an optical component more than one time.

It is a further object of the invention, to provide in an embodiment, a compact, optical device, wherein an input beam launched into the device at a first angle, returns to the input end and exits at a different angle.

SUMMARY OF THE INVENTION

In accordance with this invention, an optical device is provided that directs an input beam launched into an input end thereof, to be directed out of a same end of the device at at least one of a different port and a different angle. In one embodiment light is launched into the device at a first angle with respect to the optical axis of the lens and exits from a same end face at a different angle. In a further embodiment, light is launched into the device at a first port at an input end face, and passes through an optical element within the device two times exiting at a second port on the input end face. At least two GRIN lenses are disposed in such a manner as to allow light to pass from one lens end face to the other, however the optical axes of the lenses being offset. One of the lenses has at or near its end face, an at least partially reflective coating to allow a predetermined amount of input light to reflect backwards toward the input end. The reflective coating is positioned in such a manner as to ensure light incident upon it is collimated.

In accordance with the invention there is provided an optical device comprising: a first GRIN lens having a focusing end and a substantially collimating end, the focusing end having at least three ports, at least one being an input port and at least one being an output port, a second GRIN lens having substantially collimating face and a substantially focusing end face, the substantially collimating face being at least partially reflective to reflect at least a portion of a predetermined wavelength of light to one of the at least one output port on the focusing end of the first GRIN lens; and, an optical element disposed between the substantially collimating end faces of the first and second GRIN lenses, the first and second GRIN lenses having optical axes which are offset.

In accordance with another aspect of the invention, there is provided an optical device comprising:

a first and second GRIN lens, the lenses each having a collimating end and a focusing end, one of the focusing and collimating ends of the first GRIN lens facing the same on the second GRIN lens, the second GRIN lens having a reflective surface at or near its outer end face for reflecting light back to the first GRIN lens, the second GRIN lens having its optical axis offset from an optical axis of the first GRIN lens; and an optical element disposed between inwardly facing end faces of the first and second GRIN lenses.

In accordance with yet another aspect of the invention, there is provided an optical device comprising: a WDM filter having two juxtaposed GRIN lenses and an filter element therebetween; and, a third GRIN lens disposed to receive light from one of the two juxtaposed GRIN lenses, the third GRIN lens having a reflective surface at or about the end face for passing at least a portion of a beam having a predetermined wavelength back to the two juxtaposed GRIN lenses, the third GRIN lens having its optical axes offset from at least one of the optical axes of the two juxtaposed GRIN lenses.

In yet another embodiment of the invention, an optical device is provided, comprising a first GRIN lens and a second GRIN lens having their optical axes offset, the first GRIN lens having at least an input port at an input end face thereof, the second GRIN lens being disposed to receive light from the first GRIN lens at a first end face thereof; an at least partially reflecting surface on or about a second end face of the second GRIN lens and positioned to reflect an input beam of light launched into the input end face of the first GRIN lens, the first and second GRIN lenses, and the at least partially reflecting surface positioned to substantially collimate the input beam at the reflecting surface.

BRIEF DESCRIPTION OF THE DRAWINGS

Exemplary embodiments of the invention will now be described in conjunction with the drawings in which:

FIG. 5 is a block diagram showing three GRIN lenses having a common optical axis;

FIG. 6a is a block 7 diagram of an embodiment of the invention wherein a WDM filter is provided having one input port and two output ports each for receiving a different wavelength, and wherein one wavelength of an input beam is filtered two times;

FIG. 6b is a block diagram of an alternative embodiment of the invention having a totally reflective element and otherwise similar to the embodiment of FIG. 6a;

FIG. 6c is a block diagram of an alternative embodiment of the invention wherein a reflective element is shown spaced from an end face of the one of the lenses; and, FIG. 7a is a block diagram of an alternative embodiment of the invention having two offset GRIN lenses, and which provides an output beam which exits the device in a different direction from its input beam.

DETAILED DESCRIPTION

Figure 1:
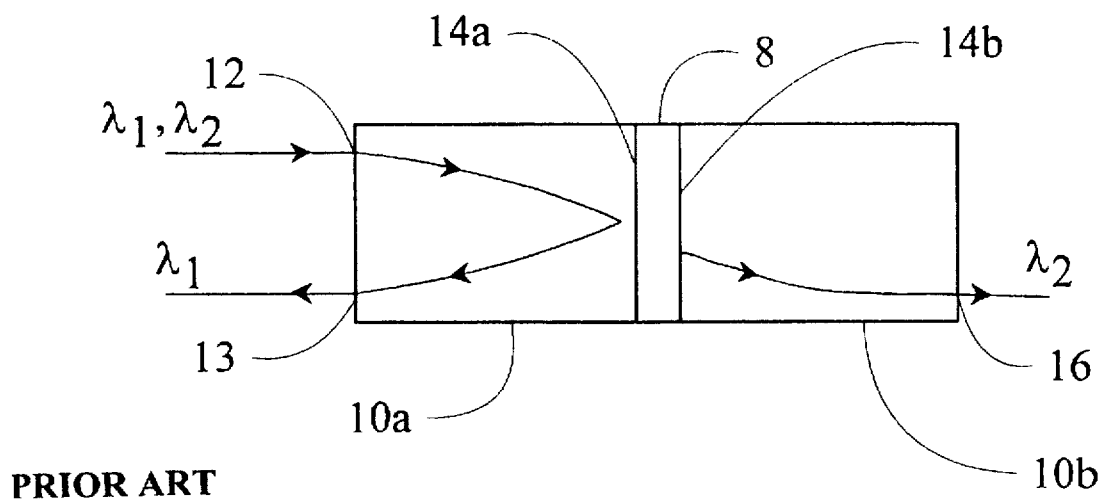
FIG. 1 is a prior art block diagram of a WDM filter using two quarter pitch GRIN lenses.

In the following description, it should be understood that same elements shown in different figures are assigned same reference numerals. Referring now to FIG. 1, a pair of quarter pitch GRIN lenses 10a and 10b are shown having a dichroic filter 8 designed to reflect light of wavelength λ1 and to pass light of wavelength λ2, sandwiched between collimating end faces 14a and 14b of the lenses. An input port 12 and an output port 13 are provided at a focusing end face of the lens 10a; the lens 10b has an output port 16 at its focusing end face that is optically aligned with the input port 12. The meaning of the word "port" in the specification is understood to be a location at an end face of a GRIN lens where light is launched into the lens or received from the lens.

Common dichroic filter elements typically comprise a pair of quarter pitch graded index (GRIN) lenses, either having one of their inside end faces coated with filter comprising a plurality of thin film layers, or have a transparent substrate, coated with thin film layers, disposed between the inwardly facing end faces of the pair of GRIN lenses.

When a composite beam of light including wavelengths λ1 and λ2 is launched into the input port 12, light of wavelength λ1 is reflected from the filter 8 in a backwards direction to output port 13 of the GRIN lens 10a. Light of wavelength λ2 is transmitted through the filter 8 and is directed to the output port 16 of the lens 10b.

Figure 2:
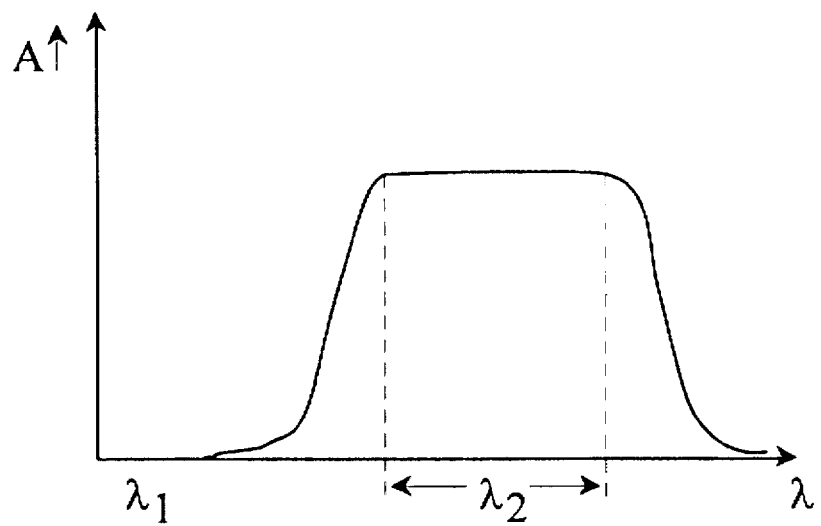
FIG. 2 is a graph of the output response of the filter shown in FIG. 1.
Figure 3:
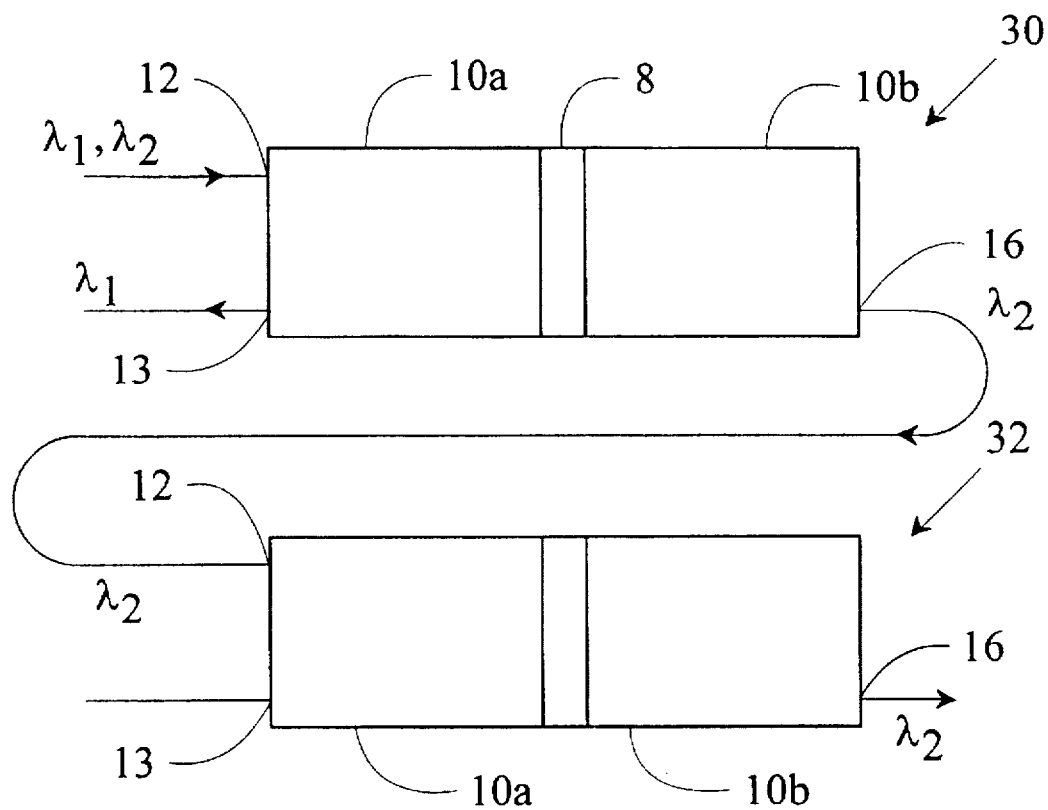
FIG. 3 is a prior art block diagram of a pair of WDM filters cascaded to provide twice filtering of the input signal of wavelength $\lambda 2$.
Figure 4:
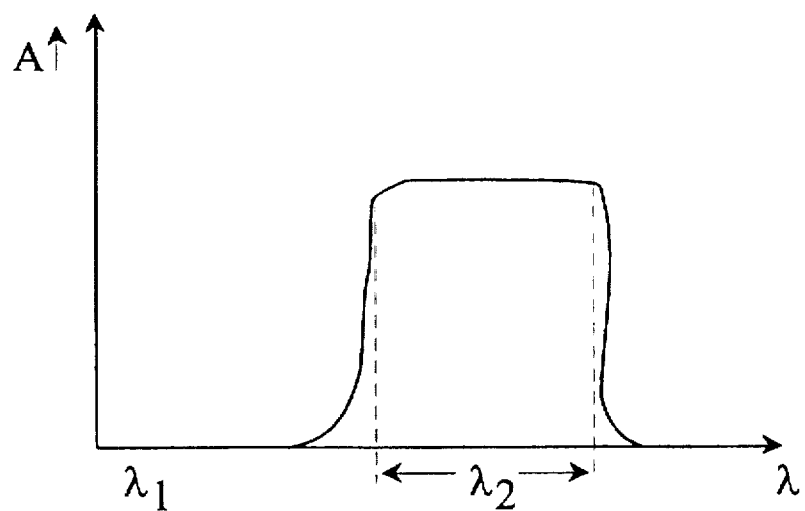
FIG. 4 is a graph of the output response of the filter shown in FIG. 3.

Referring now to FIG. 2, a graph is shown of a wavelength versus amplitude transmission response for the filter 8 of FIG. 1. One method of improving the slope of the response of the filter in FIG. 1, is to repeat filtering the output at 16, a second time, thereby producing an output response as is shown in FIG. 4 which is considerably steeper. This is accomplished by passing the signal at 16 through a same filter again, and this is shown in FIG. 3. Output 16 of the first filter 30 is connected to input port 12 of the second filter 32 using conventional coupling means such as an optical fiber tube (not shown) to couple optical fiber to the GRIN lens. Although this cascaded device performs its intended function, the associated coupling losses are significant. Furthermore, this design requires four quarter pitch GRIN lenses and relatively expensive matched dichroic optical filters.

Figure 6B:
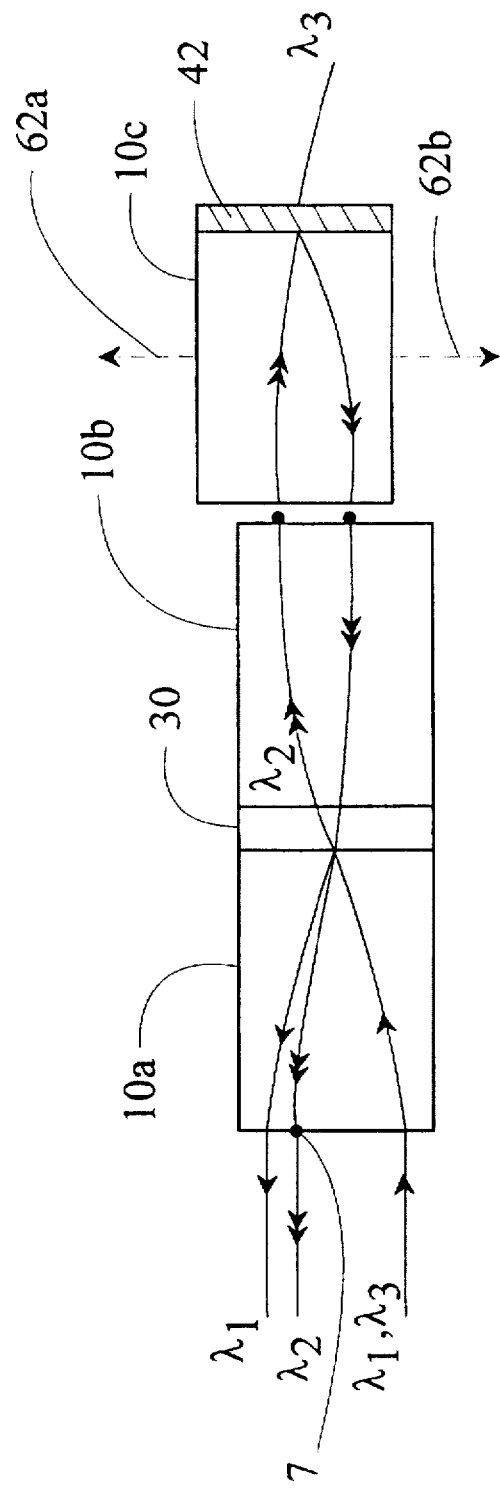

A preferred embodiment of the invention is shown in FIG. 6a wherein a third GRIN lens 10c, is optically coupled to the output port of the second GRIN lens 10b. The third GRIN lens has its outer end face coated with a reflective coating 42 to reflect light incident upon it. Although the first and second lenses 10a and 10b share a common optical axis, the third GRIN lens 10c has its optical axis offset from that of the other two lenses. This is done so that light returning from the reflective coating 42 is directed to a third port 7, on the input end face of the first GRIN lens 10a. As the position of the lens 10c is changed in the direction of the arrow 62a or 62b and the distance between the optical axes of the lenses 10c and 10b is varied, the location of the port 7 on the input end face of the lens 10a changes. The effect of moving lens 10c changes the beam angle launched into the collimated end of lens 10a which results in changing the position of the focus point (port 7) at the lens 10a. The reflective coating 42 is designed to pass 5% of light incident upon it, and thus provides a tap for tapping a portion of the signal λ2. Of course a wavelength dependent filter can alternatively be provided for reflecting one or more wavelengths and passing one or more others. In operation, light of wavelength λ1 and λ2 is launched into an input port at an end of the lens 10a. The WDM filter 30 reflects the light of wavelength λ1 and passes light of wavelength λ2 shown by double arrows, which propagates through to the lenses 10b and 10c and is mostly reflected by the reflective coating 42 in a backwards direction along a different path and exits the end face of the lens 10a at port 7. Thus the signal at port 7 of wavelength λ2 has passed through the filter 30 two times.

In an alternative embodiment the reflective coating 42 comprises a wavelength dependent coating in the form of a wavelength selective filter. In this embodiment shown in FIG. 6b the filter 30 is designed to reflect light of wavelength λ1 and pass light of wavelength λ2 and λ3. Thus, as a composite beam comprising wavelengths λ1, λ2, and λ3 incident upon the filter 30, light of wavelength λ1 is reflected, and light of wavelength λ2 and λ3 is passed and is directed to the wavelength selective filter 42. Here light of wavelength λ2 is reflected and light of wavelength λ3 is passed through the filter 42. Alternatively, light of wavelength λ3 can be launched into the end face of the filter 42 thereby adding a channel λ3. Here double filtering of light of wavelength λ2 is achieved.

FIG. 6c shows an embodiment similar to that of FIG. 6a, however no tap port is provided. The reflective element in this embodiment is a totally reflective mirror.

FIG. 5 illustrates that if the optical axis of the third lens 10c is coaxial, an not offset from the axes of the other two lenses 10a and 10b, the twice filtered beam of wavelength λ2 will return along the same path from which it was launched, resulting in the twice filtered beam exiting on the input port 12. By shifting the lens 10c as is shown in FIG. 6a, and offsetting the axes of the lenses 10b and 10c, the twice filtered beam of wavelength λ2 is directed to the third port 7.

Turning now to FIG. 7a, an alternative embodiment of the invention is shown, wherein a first GRIN lens 10a is optically coupled with a second GRIN lens 10b which has its optical axis offset from that of the first lens 10a. A reflective surface 42, which can be a discrete optical element at or about an end face of the lens 10b or a coating on the end face of the lens 10b is disposed at a position that will ensure that a beam of light incident upon the reflective surface 42 is substantially collimated. In this embodiment, light launched into the input end face at a first angle α with respect to the optical axis of the lens 10a, exits at a second different angle β from the end face of the lens 10a. In another embodiment the angles α and β can be the same but the direction of light entering and exiting the end face is different. Advantageously, this provides a means of routing an optical signal incident upon the device from a first direction to a different location by directing the signal away from the device in a second direction. In an alternative embodiment the reflective surface can be coated to allow a predetermined amount of light to pass therethrough thereby providing a tap.

Of course, numerous other embodiments may be envisaged, without departing from the spirit and scope of the invention.

What is claimed is:

1. An optical device comprising:
   a first GRIN lens and a second GRIN lens having their optical axes offset, the first GRIN lens having at least an input port at an input end face thereof, the second GRIN lens being disposed to receive light from the first GRIN lens at a first end face thereof;
   an at least partially reflecting surface on or about a second end face of the second GRIN lens and positioned to reflect an input beam of light launched into the input end face of the first GRIN lens.

2. An optical device as defined in claim 1, wherein the first and second GRIN lenses, and the at least partially reflecting surface are positioned to substantially collimate the input beam at the reflecting surface.

3. An optical device as defined in claim 2, wherein the at least partially reflecting surface is a substantially reflecting mirror.

4. An optical device as defined in claim 2, wherein the at least partially reflecting surface is an optical filter designed to pass at least one wavelength of light while substantially reflecting another wavelength of light.

5. An optical device as defined in claim 2, wherein the input beam and an output beam form different angles with respect to the optical axis of the first GRIN lens.

6. An optical device as defined in claim 2, wherein the input beam and an output beam enter and exit the device respectively, at different directions with respect to the optical axis of the first GRIN lens.

7. An optical device as defined in claim 2, further comprising a third GRIN lens disposed between the first GRIN lens and the second GRIN lens, the third GRIN lens having a same optical axis as one of the first and second GRIN lenses.

8. An optical device as defined in claim 7, further comprising an optical element disposed between an end face of the third GRIN lens and one of the first and second GRIN lenses.

9. An optical device as defined in claim 8, wherein the optical element is an optical filter.

10. An optical device as defined in claim 8, wherein the GRIN lenses are substantially quarter pitch GRIN lenses.

11. An optical device comprising:
    a) a first GRIN lens having a focusing end and a substantially collimating end, the focusing end having at least two ports, at least one being an input port and at least one being an output port,
    b) a second GRIN lens having a substantially collimating end face and a substantially focusing end face, an at least partially reflective element at or about the substantially collimating end face to reflect input light to the at least one output port on the focusing end of the first GRIN lens; and,
    c) an optical element disposed between the substantially collimating end faces of the first and second GRIN lenses, the first and second GRIN lenses having optical axes which are offset, such that the first and second GRIN lenses are not coaxial with one another.

12. An optical device as defined in claim 11, wherein the at least partially reflecting element is wavelength dependent so that it reflects at least a portion of a predetermined wavelength of the input light.

13. An optical device as defined in claim 11, wherein the partially reflecting element reflects a portion and transmits a portion of input light incident upon it.

14. An optical device as defined in claim 11, further comprising another GRIN lens having a substantially collimating end and a focusing end, said GRIN lens being disposed between the optical element and the second GRIN lens, and said GRIN lens being substantially coaxial with the first GRIN lens.

15. An optical device as defined in claim 12, wherein the GRIN lenses are all substantially quarter pitch lenses.

16. An optical device comprising:
    a first and second GRIN lens, the lenses each having a collimating end and a focusing end, one of the focusing and collimating ends of the first GRIN lens facing the same on the second GRIN lens, the second GRIN lens having a reflective surface at its outer end face for reflecting light back to the first GRIN lens, the second GRIN lens having its optical axis offset from an optical axis of the first GRIN lens; and an optical element disposed between inwardly facing end faces of the first and second GRIN lenses.

17. An optical device as defined in claim 16, further comprising another GRIN lens having a substantially collimating end and a focusing end, said another GRIN lens being disposed between the optical element and the second GRIN lens, and said GRIN lens being substantially coaxial with the first GRIN lens.

18. An optical device comprising:
    a) a WDM filter having
       two juxtaposed GRIN lenses and a filter element therebetween; and,
    b) a third GRIN lens disposed to receive light from one of the two juxtaposed GRIN lenses, a reflective element at or about the third GRIN lens end face for passing at least a portion of a beam back to the two juxtaposed GRIN lenses, the third GRIN lens having its optical axes offset from at least one of the optical axes of the two juxtaposed GRIN lenses.

19. An optical device as defined in claim 18, wherein the reflective element at or about the third GRIN lens end face for passing at least a portion of a beam back to the two juxtaposed GRIN lenses is a wavelength dependent element for passing at least a predetermined wavelength of light and for reflecting at least a predetermined other wavelength of light.

* * * * *